J. BEAVIS.

METAL ROLLING MACHINE.

No. 10,594. Reissued May 5, 1885.

WITNESSES

W. Engel

J. A. Brown.

INVENTOR

John Beavis

By Thos. P. Hall

ATTORNEY

UNITED STATES PATENT OFFICE.

JOHN BEAVIS, OF CLEVELAND, OHIO.

METAL-ROLLING MACHINE.

SPECIFICATION forming part of Reissued Letters Patent No. 10,594, dated May 5, 1885.

Original No. 175,904, dated April 11, 1876. Application for reissue filed January 24, 1878.

*To all whom it may concern:*

Be it known that I, JOHN BEAVIS, of Cleveland, in the county of Cuyahoga and State of Ohio, have invented certain new and useful Improvements in Machinery for Rolling Metal, &c.; and I do hereby declare the following to be a full, clear, and exact description of the invention, such as will enable others skilled in the art to which it pertains to make and use it, reference being had to the accompanying drawings, which form part of this specification.

My invention relates to an improvement in machinery for making wire or bars of metal by the process of rolling.

Figure 1:
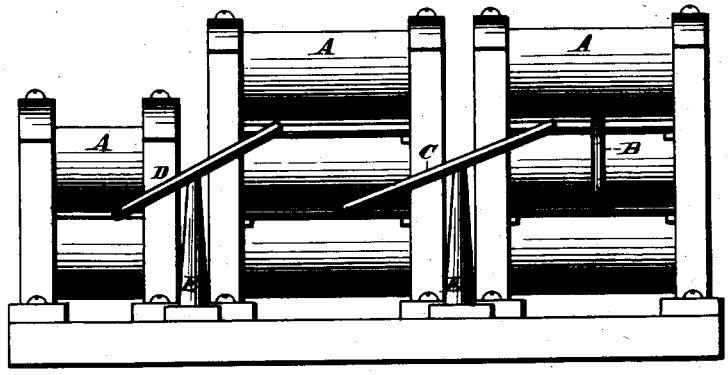
Figure 2:
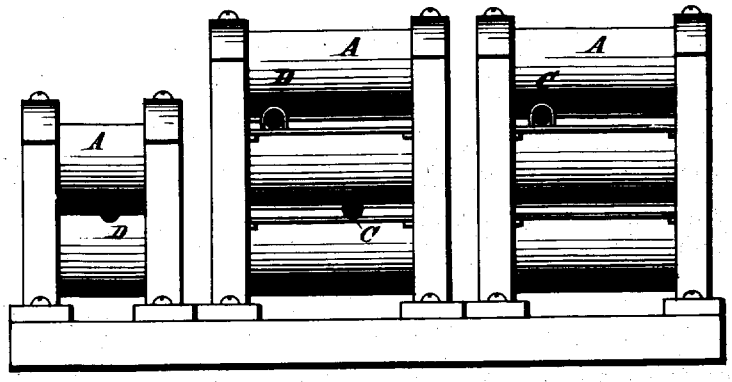
Figure 3:
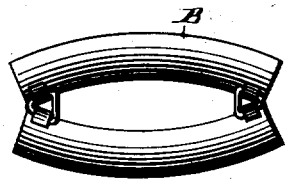

In the drawings, Figure 1 shows in front elevation a train of rolls, part two-high and part three-high, with my invention attached. Fig. 2 is a view taken in cross-section through two of the guides or viaducts shown in the preceding view. Fig. 3 is a detached view showing the manner in which my viaducts open to permit the escape of the bar or wire when necessary.

A A represent rolls of any style or description. B is a viaduct to receive from the lower passes of three-high rolls and deliver to the upper passes of the same, or vice versa. C is a viaduct to receive from the upper passes of a set of three-high rolls and deliver to the lower passes of a neighboring set of a train, or vice versa. D is a viaduct to receive from the upper passes of a set of three-high rolls and deliver to a neighboring set of two-high rolls in a train, or vice versa. Each viaduct is made in two longitudinal parts, hinged or jointed together in such a manner that their component parts can open or unfold and permit the escape of the contents.

Operation: The rolls A may be of any nature or description, inasmuch as they form no part of my invention, and as my invention is equally applicable to rolls of any description. The viaducts B, C, or D are supported in any suitable manner, so that they shall be held stationary in the proper position. To this end they may be fixed upon posts or standards E, or they may be held by brackets from the frame of the rolls, or in any other desired manner.

To illustrate the operation of my invention, it is only necessary to describe the working of a single viaduct, and for that purpose we will select the one marked B in the drawings. We will suppose that it is to receive from the upper tier of passes and feed or deliver at the lower tier. The rod or wire as it is fed in at the upper pass is directed and propelled directly into the viaduct B, and is thereby directed downward and properly fed into the proper pass below.

As the operation of the upper and nether rolls progresses there will be more or less surplus or slack in the material being rolled, and if the viaduct were a solid piece it would soon become gorged and inoperative. To obviate this difficulty I have provided a means of opening the viaduct automatically, by constructing it of the two longitudinal sections shown, and hinging them together in such a way that this slack or overplus just mentioned shall of itself serve to open the viaduct and permit an escape of said overplus.

The only function of my viaducts is to afford a primary guide or director of the bar or wire from one pass to another of a set or train of rolls. In other words, my viaducts are intended merely to receive from one pass and to guide and feed into another pass upon the rolls. This done, their function is accomplished, and to prevent their afterward being of detriment I have constructed them to permit the escape of their contents, as may be necessary.

I do not limit myself to any particular shape or fashion of my viaducts, as they must needs be varied in this particular to meet special requirements.

What I claim is—

1. In a metal-rolling machine, the combination, with rolls, of a curved guide which receives from one roll-pass and feeds into another roll-pass, said guide formed open and permitting the surplus metal to escape out of it, substantially as set forth.

2. In metal-rolling machinery, the combination, with rolls, of a curved guide which receives from one roll-pass and feeds into another roll-pass, said guide provided with an opening permitting the surplus metal to escape out of said guide, substantially as set forth.

JOHN BEAVIS.

Witnesses:
JNO. CROWELL, Jr.,
FRANK M. FABER.